April 24, 1956     G. R. DUNCAN     2,742,876
VACUUM CONTAINER MILKING SYSTEM AND APPARATUS THEREFOR
Original filed Sept. 26, 1952     2 Sheets-Sheet 1
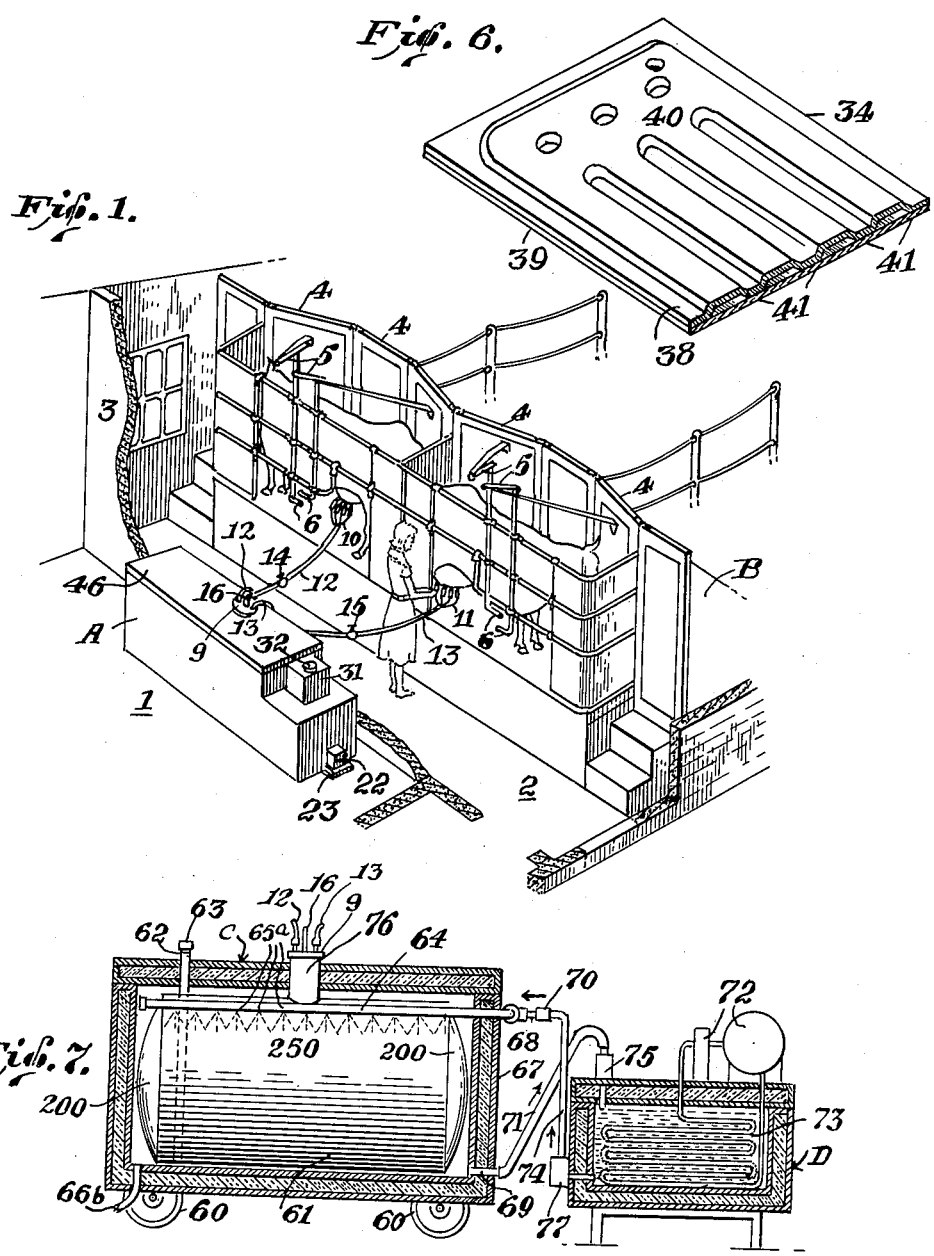
INVENTOR
GEORGE R. DUNCAN.
BY *Mason, Mason & Sheridan*
ATTORNEYS

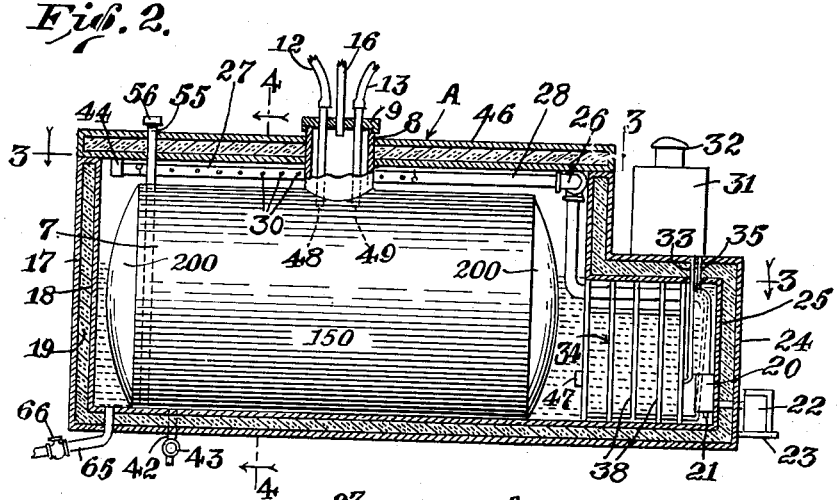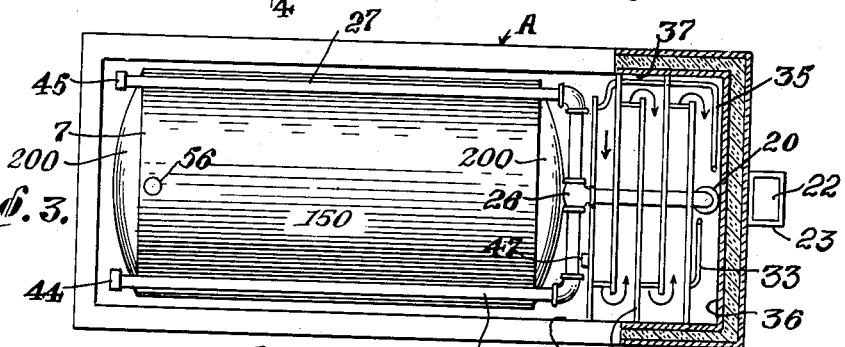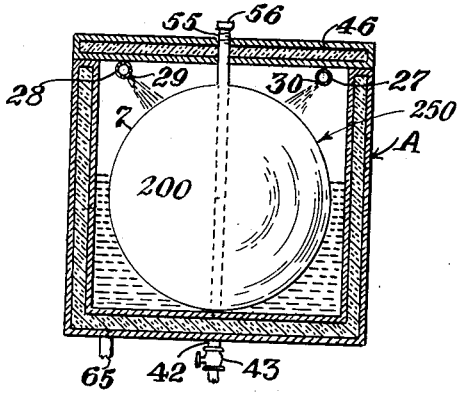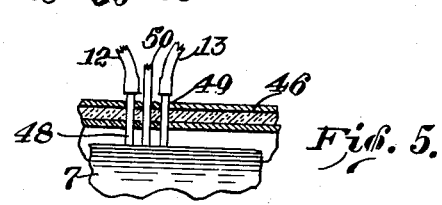
INVENTOR
GEORGE R. DUNCAN.
BY Mason, Mason & Sheridan
ATTORNEYS

United States Patent Office 2,742,876
Patented Apr. 24, 1956

2,742,876

VACUUM CONTAINER MILKING SYSTEM AND APPARATUS THEREFOR

George R. Duncan, Washington, Mo., assignor to Zero Manufacturing Company, Washington, Mo., a company of Missouri Original application September 26, 1952, Serial No. 311,771, now Patent No. 2,702,019, dated February 15, 1955. Divided and this application April 26, 1954, Serial No. 425,680

12 Claims. (Cl. 119—14.09)

This application is a division of my co-pending application Serial No. 311,771, filed September 26, 1952, now patent No. 2,702,019, granted February 15, 1955.

This application relates to a milking system for milking one or more cows and for causing the milk to flow into a container within a refrigerator or other milk cooler.

An object of the invention is to provide a milking system wherein the milk is drawn from the animals by means of minus pressure and is deposited by said pressure within a receptacle.

An additional object of the invention is to provide a system for handling milk whereby the milk is untouched by human hands and is fed directly from the farm animals to a receptacle from whence it may be withdrawn to a milk tank or truck. The milk may be withdrawn from the milk receptacle to the truck by means of a hose connection from the truck to the milk receptacle by the suction means on the truck.

An additional object of the invention is to provide a system of the above type in which a receptacle within a refrigerator is cooled exteriorly as the receptacle is filled with milk, so as to maintain the milk in the receptacle below a maximum number of degrees, say 40° F.

A further object of the invention is to provide means for cooling milk in bulk within a receptacle which is fixed within a refrigerator or other milk cooler.

Other objects will appear hereinafter throughout the specification.

In the drawings:

Figure 1 is a perspective view of the system in operation with part of one separating wall broken away;

Figure 2 is a vertical section of the cooler, with the milk receptacle and certain parts of the pipe system shown in full lines;

Figure 3 is a horizontal section taken on the line 3—3 of Figure 2;

Figure 4 is a vertical section taken on the line 4—4 of Figure 2, with the milk receptacle shown in full lines;

Figure 5 is a partial vertical section showing a portion of the receptacle in broken lines of a modified form of the invention;

Figure 6 is a perspective view showing one of the combined heat exchange units and water baffles partly in section; and Figure 7 is a view partly in vertical section of another form of the invention.

The present invention is an improvement on the structure shown in several of my prior issued United States patents, including Patents Nos. 2,470,977; 2,482,579; and 2,498,401; and relates to a specifically different heat exchange means for the bulk milk receptacle than that shown in my Patent No. 2,702,019.

Referring to the drawings, as shown in the several figures, the letter A indicates a refrigerator or milk cooler and B a pair of raised milking platforms forming cow feeding and milking stalls.

Referring particularly to Figure 1 which shows a layout suitable for use with the present system, 1 is a space forming part of a milking parlor, preferably separated from a milker's aisle 2 by a partition or wall 3. The cooler is preferably located in the milking parlor adjacent to partition 3 as shown.

The animals are admitted to their respective milking stalls, and led out of the same via ramps (not shown). Access to and from each of the stalls is through pairs of pivoted doors 4 which are controlled by levers 5 by means of handles 6.

Located within the refrigerator or cooling cabinet A is a bulk receptacle 7 preferably constructed of stainless steel, aluminum, or other non-rustible metal, having a neck portion 8 and a cover 9 therefor. The cover is provided with means (not shown) whereby it may be hermetically sealed to the neck portion.

The numerals 10 and 11 indicate two sets of teat cups which are connected to conduits 12 and 13, having valves 14 and 15 respectively. These milk lines or conduits 12 and 13 extend through a window (not shown ) in wall 3 and through the cover 9. These conduits may be provided with sealing means similar to sealing means shown in my United States Patent No. 2,498,401, except that one of said sealing means will be provided for each milk conduit.

The numeral 16 indicates a vacuum line or conduit which is preferably connected to a source of minus pressure, such as a milking machine such as indicated in my Patent No. 2,512,094. The conduit will also be provided with the usual sealing means, such as a gasket (not shown) where it passes through the cap 9.

It will be noted by reference to Figure 1 that due to the elevated position of the cows and the lower position of the milk receptacle in the refrigerator, the milk flows to the container partly by gravity and with a minimum of minus pressure applied by the pulsator or vacuum or other milking system to which the line is connected, such as shown in my Patent No. 2,512,094.

Preferably, the milk cooler A is provided with double walls 17 and 18, and the spaces between said walls are filled with insulation 19. As indicated in Figures 2 and 3, a pump 20 having an inlet 21 is driven by an electric motor 22 mounted on the stand 23 supported on the side wall 24 of the cooler.

The pump draws water from the sump of the cooler and forces water up the pipe 25 to the fitting 26 and out each of the passageways 27 and 28. Each of the passageways is provided with a plurality of spaced perforations 29 and 30. The water issuing from these passageways engages the sloping walls of the container 7 and chills the exterior thereof. The chilled walls of the container cool the milk continuously as it passes into the tank through the milk conduits 12 and 13. One or more of said conduits 12 or 13 may be used according to the number of cows that are simultaneously milked.

The refrigerating unit is indicated at 31. This may be provided with conventional regulating means 32 for regulating the temperature of the refrigerant. The refrigerant passes downwardly by means of the pipe 33 to a series of combined baffle and heat exchange units which are connected to each other as shown in Figures 2 and 3. The refrigerant then passes up through the return pipe 35 to the refrigerating unit 31.

It will be noted by reference to Figures 2 and 3 that the series of units 34 are located in staggered relationship so as to leave a serpentine passageway for the passage of water in the lower portion of the refrigerator, from the lower portion of the refrigerator in which is located the receptacle 7, to the pump 20.

By reference to Figure 3, it will be noted that three units 34 are affixed to inner refrigerator wall 36, and that the alternate units are attached to inner refrigerator wall 37, so as to provide for a more complete heat exchange between the comparatively warm water and the refrigerant in the several coils 34.

Referring to Figure 6 which shows a broken away perspective view of one of the units 34, each of said units is preferably constructed of a pair of zinc metallized plates 38 and 39. Portions 40 of the plate 38 have been forced inwardly and welded at 41 to the other plate 39. In this manner a comparatively thin heat exchange unit is provided having a maximum area for heat exchange purposes.

A drainage conduit 42 having a valve 43 from the receptacle is led through the floor portion of the cooler to an outlet (not shown). A second drainage conduit 65 having a valve 66 is for the purpose of draining water from the cooler A.

Each of the passageways 27 and 28 is preferably provided with a removable screw threaded closure 44 and 45 respectively as seen in Figure 3. These closures are engaged with screw threaded ends of the passageways (not shown). They may be removed for cleaning the passageways. The refrigerator is preferably provided with a removable top 46 that may have a conventional hinged or slidable mounting on the cooler body (not shown). Alternatively, side door means (not shown) may be provided as shown in Figure 1 of my United States Patent No. 2,512,094.

Briefly, the operation of the system is as follows: The animals are driven into their separate stalls and secured in the position shown in Figure 1. As soon as the pair of animals, or one of them, has been milked, another pair, or another of them, is driven onto the platforms, so that the operation is substantially continuous. The vacuum line applies suction to the milk lines, and as the milk enters the tank through the conduits 12 and 13, the sides of the tank are continuously chilled by the water issuing from the passageways 27 and 28. The water which has passed to the lower sides of the container moves over an ice bank which builds up around the lower sides of the container. The water is further chilled as it moves around the serpentine passageway defined by the series of cooling units 34. The temperature of the refrigerant in addition to being regulated by the means 32 shown in Figure 2, may also be further regulated by the thermostatic means 47 which is connected to the refrigerating unit by conventional wiring connections (not shown). This regulating means may be mounted on pipe 33 or in any suitable position. The purpose of these controls is to regulate the temperature within the cabinet and the temperature of the milk, so that the milk is maintained at a given temperature. These controls indicated by numerals 32 and 47 are thermostatic controls.

The pipe 55 which leads from the exterior of the cooler to adjacent the bottom of the milk receptacle has screw threads at the upper end thereof to which a cap may be attached. When it is desired to empty the bulk receptacle, the cap is removed and a suction pipe of a milk tank truck, having suitable fittings, is attached to the pipe upper end. Suction from a pump on the truck is applied to pipe 55 and the bulk receptacle 7 in order to completely empty the said receptacle, after which the pick-up truck proceeds to a creamery or other place of disposal. This system eliminates the use of the conventional milk cans.

I may remove the cover 9 and its conduits and use the neck portion of the receptacle as a pour-in opening, although I prefer to employ the system heretofore described.

The receptacle preferably is cylindrical in cross section, but I may use instead a receptacle of oblong, square, hexagonal, or other cross section.

"Conduit means" in the claims includes the entire system of conduits leading into the receptacle, such as the conduit or conduits leading from the source of minus pressure, and the conduits 12 and 13 leading to the sets of teat cups.

In the form shown in Figure 5, the conduit means need not extend through the cover 9, but in this construction the milk conduits 48 and 49 and the vacuum conduit 50 extend through the top 46 directly into the milk receptacle 7.

In the modification disclosed in Figure 7, C is the milk cooler. The milk cooler is mounted on wheels 60, so that the milk cooler may be wheeled into the milk parlor, whereby it may take the place of the milk cooler A shown in Figure 1. The tank, after filling, may be transported or wheeled to the creamery or other place of disposal, the milk being removed from the tank 61 by means of drainage conduit 62 having a cap or cover 63 which extends into the tank 61. This structure is similar to the structure indicated by numerals 55 and 56 in Figure 2. One or more spray pipes 64 are located adjacent the upper inner portion of the cooler C, and these spray pipes are provided with a series of openings 65a for spraying a cooling liquid onto the exterior portion of the tank. The cooler is drained by a suitable pipe 66b that is closed by a valve (not shown). The pipes 64 extend through the side 67 of the cooler through an opening 68. Cooling water is drained from the cooler through the exhaust conduit or pipe 69. These pipes 64 and 69 have projecting ends to which are attached flexible conduits 70 and 71 respectively.

A second cabinet D is permanently mounted in the milking parlor 1 shown in Figure 1. This second cabinet is in the form of a tank having mounted on it the usual compressor-condenser indicated diagrammatically at 72, the cooling coils 73 of which are located in the cabinet D, as shown. These cooling coils chill the water which passes through the pipe 71 into the cabinet D, and the water, after having been chilled, passes upwardly through the conduit 74 by any suitable means, such as the pump 77, into flexible conduit 70 and into pipe 64 from whence it passes outwardly through openings 65a to the exterior of tank 61. The warmed water in the lower portion of cooler C may be caused to pass outwardly and then upwardly through the pipe 71 by any suitable means, such as the pump 75, shown diagrammatically in the opening to the second cabinet.

The milk receptacle is provided with ends such as the semi-spherical ends 200, shown in Figures 2, 3, 4 and 7 of the drawings.

It will be understood that the usual connections including the cover 9, shown in Figure 1, milk lines and vacuum lines 12, 13, and 16, shown in Figure 2, are used on the opening 76 of cabinet C in Fig. 7.

In operation, the cooler C is wheeled into the milking parlor and the flexible conduits 70 and 71 are connected to the pumps 75 and 77, as shown in Figure 7. The milk is thoroughly chilled during the milking operation and is maintained at a low temperature, say 39° F. When it is desired to convey the milk in the cooler C to a creamery, the flexible conduits 70 and 71 are disconnected, and at this time, the ends of the pipes 64 and 69 to which said conduits have been attached, may be disclosed by suitable plugs (not shown). The cooler is then wheeled into a truck or it may be towed to a creamery or other point of disposal. It will be understood that the cool water remaining in the cooler 6 will serve to maintain the temperature of the milk in tank 61 sufficiently low during transportation of the tank to its point of destination.

In Figures 2, 3, and 4, the numeral 150 and in Figure 7, the numeral 250, all indicate the ends of the milk cooler shell, referred to heretofore as the tank or a receptacle, which ends are semi-spherical in cross section.

The part 21 shown in Figure 2, and parts 69 and 71 shown in Figure 7, form the inlet for the pump, but said parts also act as an exhaust conduit for exhausting fluid within the space of the insulated milk cooling means, and hence, the term "exhaust conduit" in the claims refers to the passage whereby fluid is drawn or exhausted from the space in which the bulk milk cooler 2 is located, as shown, for instance in Figures 2 and 4 of the drawings.

The phrase "substantially cylindrical form" as applied to the milk receptacle in the claims is not limited to a receptacle having a cylindrical cross section, but said cross section may be of varied limits such as oval, elliptical, or other forms, the term being used to distinguish from a completely straight sided structure.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending into said receptacle through said receptacle portion whereby to maintain a continuous vacuum in said bulk milk receptacle during the milking operation.

2. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending into said receptacle whereby to maintain a continuous vacuum in said bulk milk receptacle at least during the milking operation.

3. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means for cooling said receptacle during the milking operation including a refrigerating means and a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending into said receptacle through said receptacle portion whereby to maintain a continuous vacuum in said bulk milk receptacle at least during the milking operation.

4. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape, said first conduit means extending into the interior of said bulk milk receptacle and into said vacuum receptacle, means for cooling said receptacle during the milking operation including a refrigerating means and a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending through said milk cooler and into said bulk milk vacuum receptacle whereby to maintain a continuous vacuum in said bulk milk receptacle at least during the milking operation.

5. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally cylindrical with ends which are semi-spherical in shape, and having a portion extending through a top wall of said cooler, said first conduit means extending into the interior of said bulk milk receptacle through said portion, means including a refrigerating means and a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending into said receptacle through said receptacle portion whereby to maintain a continuous vacuum in said bulk milk receptacle at least during the milking operation, said milk receptacle portion including a neck extending through the said milk cooler, a cover for said neck, said first conduit and third conduit means extending through said cover.

6. In a system for milking a farm animal and for cooling and storing the milk in a bulk receptacle as it comes from the animal, comprising milking means and first conduit means extending therefrom, a milk cooler having insulating walls, a bulk milk metallic vacuum receptacle in said cooler, said bulk milk receptacle being generally horizontally cylindrical with ends which are semi-spherical in shape and having a portion extending vertically through a top wall of said cooler, said first conduit means extending into the interior of said bulk milk receptacle through said portion, means for cooling said receptacle during the milking operation including a refrigerating means and having a second conduit means leading therefrom and having a pipe means extending adjacent the sides of the bulk milk receptacle and within said milk cooler, said pipe means having a plurality of perforations for spraying water on the cylindrical sides of said bulk milk receptacle whereby the milk in said receptacle may be continuously cooled by the spraying of cooled water thereon as cooled by said refrigerating means at least during the milking operation, and a third conduit means, said third conduit means extending into said receptacle through said receptacle portion whereby to maintain a continuous vacuum in said bulk milk receptacle at least during the milking operation, said milk receptacle portion including a neck extending through the said milk cooler, a cover for said neck, said first conduit means and third conduit means extending through said cover.

7. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation.

8. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation, said spray means including a pipe means having a plurality of spaced perforations.

9. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation, said spray means including a plurality of pipes extending longitudinally of said side walls, said pipes having spaced perforations therein.

10. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation, said refrigerating means including a base, a compressor-condenser unit mounted on said base, said base being located exteriorly of said milk cooling means, said spray means including a pipe means extending from said compressor-condenser to the interior of said milk cooling means and adjacent the side walls of said milk receptacle.

11. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation, said refrigerating means including a compressor-condenser unit mounted on said milk cooling means.

12. A system for milking a farm animal and delivering the milk as it comes from the animal into a cooled bulk receptacle, comprising a milking means, a milk cooling means having insulating surrounding walls, a single milk receptacle permanently fixed in said cooling means and occupying a substantial part of the interior space thereof, said milk receptacle being of substantially cylindrical form, a milk line interconnecting said milking means and said milk receptacle, vacuum means, and drain means operatively associated with said receptacle, a spray means in said cooling means directed toward the side walls of said milk receptacle, an exhaust conduit in said cooling means, and refrigerating means operatively connected to said spray means and to said exhaust conduit for continuously spraying cooled liquid on said milk receptacle during the milking operation, said milk cooling means being fluid-tight whereby to accumulate fluid from said spray means to thereby partly immerse said milk receptacle therein, and whereby said exhaust conduit may pick up fluid therefrom.

References Cited in the file of this patent

UNITED STATES PATENTS

| | | |
|---|---|---|
| 1,987,917 | Thwaits | Jan. 15, 1935 |
| 2,024,639 | Greene | Dec. 17, 1935 |
| 2,498,401 | Duncan | Feb. 21, 1950 |
| 2,512,094 | Duncan | June 20, 1950 |
| 2,515,767 | Fibus | July 18, 1950 |
| 2,557,252 | Bannister et al. | June 19, 1951 |
| 2,690,061 | Markley | Sept. 28, 1954 |

FOREIGN PATENTS

| | | |
|---|---|---|
| 636,525 | Great Britain | May 3, 1950 |